(12) United States Patent
Maruyama

(10) Patent No.: US 6,298,397 B1
(45) Date of Patent: *Oct. 2, 2001

(54) DATA TRANSFER CONTROL SYSTEM DETERMINING A START OF A DIRECT MEMORY ACCESS (DMA) USING RATES OF A COMMON BUS ALLOCATED CURRENTLY AND NEWLY REQUESTED

(75) Inventor: Teruyuki Maruyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,658

(22) Filed: Jul. 21, 2000

Related U.S. Application Data

(63) Continuation of application No. 09/127,805, filed on Aug. 3, 1998, now Pat. No. 6,119,176.

(30) Foreign Application Priority Data

Aug. 5, 1997 (JP) .................................................. 9-210233

(51) Int. Cl.⁷ ........................................................ G06F 13/28
(52) U.S. Cl. ................................ 710/25; 710/22; 710/23; 710/28; 710/29
(58) Field of Search ............................. 710/22–29, 112, 710/113, 117, 119, 124, 33–35; 370/232–234

(56) References Cited

U.S. PATENT DOCUMENTS

| | | | |
|---|---|---|---|
| 4,987,529 | * 1/1991 | Craft et al. ........................... | 710/113 |
| 5,423,020 | * 6/1995 | Vojnovich ............................... | 710/22 |
| 5,533,205 | * 7/1996 | Blackledge, Jr. et al. ........... | 710/117 |
| 5,655,151 | * 8/1997 | Bowes et al. .......................... | 710/22 |
| 5,742,601 | * 4/1998 | Riedel ................................... | 370/395 |
| 6,055,577 | * 4/2000 | Lee et al. .............................. | 709/233 |

\* cited by examiner

*Primary Examiner*—Thomas Lee
*Assistant Examiner*—Ilwoo Park
(74) *Attorney, Agent, or Firm*—Oblon, Spivak, McClelland, Maier & Neustadt, P.C.

(57) ABSTRACT

It is determined that, when starting of direct memory access is newly requested, whether or not the direct memory access can be started, using a rate of using the bus at the present time by data transfer performed by all the direct memory access controllers which have already started direct memory access until then and all the processors, a data transfer rate needed by the newly requested direct memory access, a size of data which is transferred in one direct memory access operation or a size of data which a memory can accept, a latency for accessing the memory, and a latency for bus-right arbitration. The newly requested direct memory access is started when it is determined that the direct memory access can be started. Starting of the newly requested direct memory access is kept waiting when it is determined that the direct memory access cannot be started. The newly requested direct memory access, which has been kept waiting, is started when any direct memory access which has already been carried out finishes, and enough capacity is free in the common bus for carrying out the newly requested direct memory access.

3 Claims, 10 Drawing Sheets

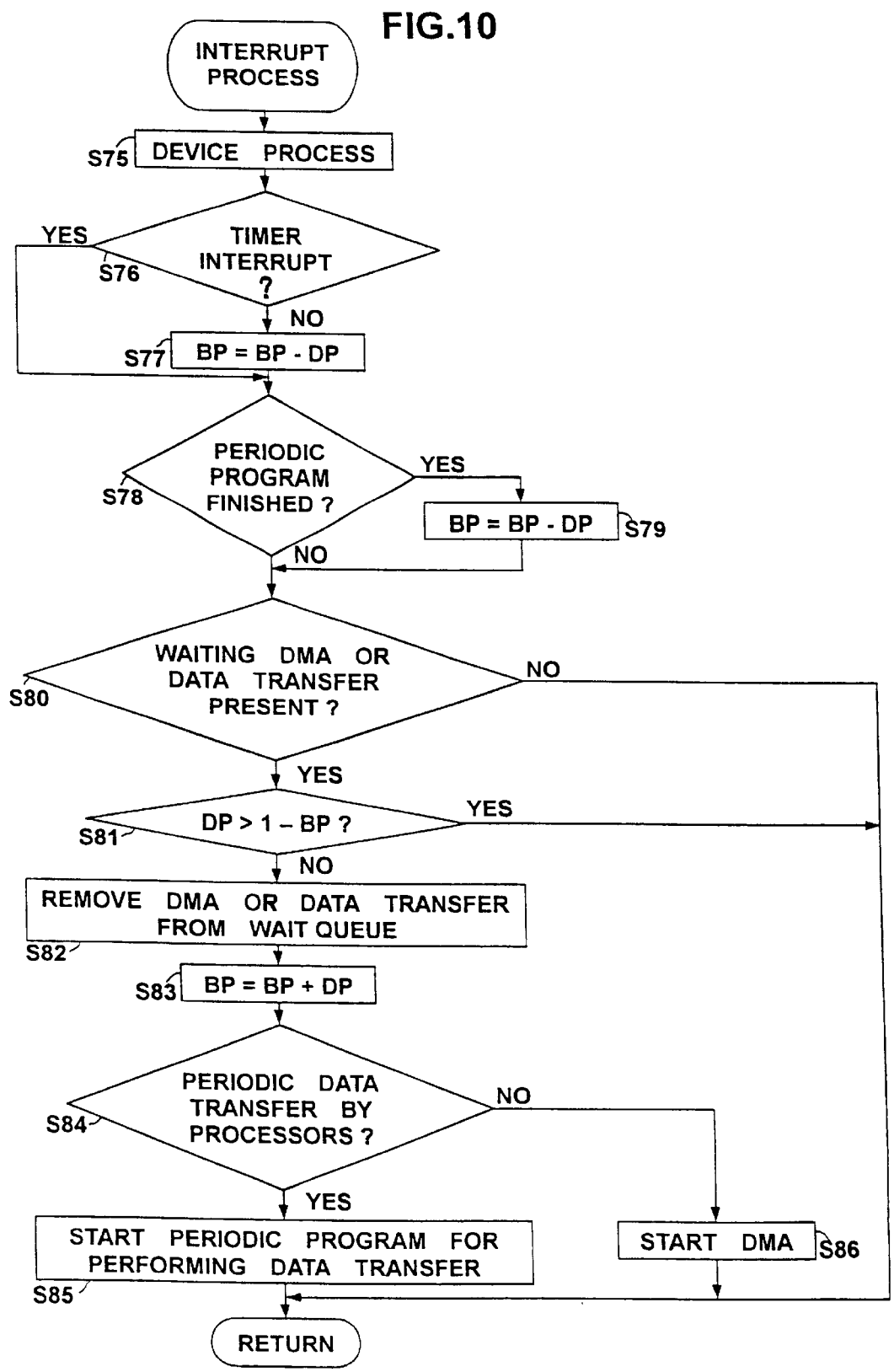

DATA TRANSFER CONTROL SYSTEM DETERMINING A START OF A DIRECT MEMORY ACCESS (DMA) USING RATES OF A COMMON BUS ALLOCATED CURRENTLY AND NEWLY REQUESTED

This application is continuation of Ser. No. 09/127,805 filed Aug. 3, 1998, U.S. Pat. No. 6,119,176.

BACKGROUND OF THE INVENTION

1. Field of the Invention

The present invention relates to a data transfer control method, a data transfer control system, and an information recording medium in an information processing apparatus having a computer arrangement in which DMA controllers are connected to a common bus and data transfer is performed.

2. Description of the Related Art

Generally speaking, in an information processing apparatus, for a purpose of transmission and reception of data with a peripheral device, a DMA controller (hereinafter, simply referred to as a 'DMAC') is connected to a system bus or an I/O bus, and, by using the DMAC, DMA (Direct Memory Access) is performed, that is, a memory is directly accessed.

In many cases, data transfer performed with a peripheral device is performed in an asynchronous method, and data transfer is performed with handshaking. In such a case, a capacity of a bus used for data transfer is not previously known clearly.

Further, when data transfer is performed synchronously with a peripheral device or a network, a capacity of a bus used when the synchronous data transfer is performed, a maximum capacity of the bus used when data transfer is performed, and, also, a capacity of the bus used when a transaction is performed by a CPU are considered. Thus, a specification of the bus is determined, and, the bus is designed, or the bus is obtained, as a result of selection. Thereby, it is guaranteed that the entire transaction is performed without stagnation.

However, thereby, the specification of the bus is excessive except for a rare case where congestion of the bus occurs.

Further, in an expansion I/0, it is not determined at a timing of designing a system as to which expansion board is to be inserted and what amount of data transfer is required. Thereby, unexpected congestion occurs in a bus when the system is actually used, and data transfer may not be performed without stagnation.

In particular, in data transfer control in an information processing apparatus in the related art, a capacity of a bus used when a DMAC, a CPU, and so forth use the bus, and a capacity of the bus used when data transfer is performed by a peripheral device are not considered. As a result, a new DMA is started when new data transfer is requested from an application program or the like even in a condition where the bus is already saturated. When such a situation occurs, loss of data occurs in an interface which performs synchronous data transfer using a certain capacity of the bus. Thus, a serious situation may occur in the system. Such a problem may occur not only in an interface using the newly started DMA but also in every interface which performs synchronous data transfer.

For example, when data transfer in a new interface performed by an application program or the like is required under a condition where data transfer in an interface, which needs data transfer of a fixed data transfer rate, such as a video interface, a network interface or the like, has already been performed by using a common bus, a new DMA is started even in a case where there is no sufficient free capacity of the bus. As a result, the data transfer is not guaranteed. Such a problem may occur in particular in a case where successive data transfer such as that of an operation for copying a large amount of data or data transfer by a periodically performed program is required.

Further, for example, in a case of using an IEEE 1394, in which data of frequencies of 100 MHz, 200 MHz and 400 MHz are mixed in one interface, a data transfer rate of data reception is not known until data from the interface is actually received, and, thus, a capacity of a bus needed for DMA used for storing the data in a memory cannot be previously known. As a result, the data may not be completely stored in the memory.

In an interface for asynchronous data transfer, because data transmission and reception is performed with handshaking, a data transfer rate depends on a particular device with which communication is performed, and, thus, a capacity of bus needed for DMA used for storing data in a memory cannot be previously known. As a result, data may not be completely stored in the memory for a particular device with which communication is performed.

SUMMARY OF THE INVENTION

An object of the present invention is to provide a data transfer control method, a data transfer control system and an information recording medium, in which data transfer of a necessary data transfer rate can be guaranteed for each of a plurality of DMACs each of which needs a predetermined data transfer rate and is connected to a common bus.

In a data transfer control, according to the present invention, for controlling direct memory access performed by direct memory access controllers in a system including processors, the direct memory access controllers being connected with a common bus, it is determined that, when starting of direct memory access is newly requested, whether or not the direct memory access can be started, using a rate of using the bus at the present time by data transfer performed by all the direct memory access controllers which have already started direct memory access until then and all the processors, a data transfer rate needed by the newly requested direct memory access, a size of data which is transferred in one direct memory access operation or a size of data which a memory can accept, a latency for accessing the memory, and a latency for bus-right arbitration;

the newly requested direct memory access is started when it is determined that the direct memory access can be started;

starting of the newly requested direct memory access is kept waiting when it is determined that the direct memory access cannot be started; and the newly requested direct memory access, which has been kept waiting, is started, when any direct memory access which has already been carried out finishes, and enough capacity is free in the common bus for carrying out the newly requested direct memory access.

Thus, when data transfer for an interface is newly requested by an application program, a system control program or the like, and starting of newly requested DMA for the interface is requested, and when the newly requested DMA for the interface cannot be started in consideration of a free capacity of the common bus, the starting of the newly requested DMA is kept waiting. Thereby, it can be prevented that data transfer cannot be guaranteed due to starting of the newly requested DMA when the data transfer for an interface which needs data transfer of a fixed data transfer rate has been already started using the common bus. Thus, it is possible to guarantee data transfer at a necessary data transfer rate for each of the plurality of DMACs each of which needs the predetermined data transfer rate and is connected with the common bus.

The rate of using the bus at the present time by data transfer performed by all the direct memory access controllers which have already started direct memory access until then and all the processors may be calculated using a data transfer rate needed by the direct memory access performed by each of the direct memory controllers, the size of data which is transferred in one direct memory access operation or the size of data which the memory can accept, the latency for accessing the memory, and the latency for bus-right arbitration.

Thus, the rate of using the bus at the present time which is used for determining whether newly requested starting of DMA can be permitted can be easily calculated based on information concerning DMA which has been already started. As a result, it is not necessary to change the hardware arrangement to incorporate a special circuit for this purpose.

It may be determined whether or not an interface can be activated, the interface being connected with the direct memory access controller and receiving data at an arbitrary timing to the system, using a rate of using the bus calculated by using a data transfer rate needed by direct memory access when data received by the interface is written in the memory, the size of data which is transferred in one direct memory access operation or the size of data which the memory can accept, the latency for accessing the memory, and the latency for bus-right arbitration;

when it is determined that the interface can be activated, the rate of using the bus, calculated for the interface, may be added to the rate of using the bus at the present time by the data transfer performed by all the direct memory access controllers which have already started direct memory access until then and all the processors, and the interface may be activated;

when the interface is inactivated, the thus-added rate of using the bus may be subtracted from the rate of using the bus at the present time;

activation of the interface may be kept waiting when it is determined that the interface cannot be activated; and the interface may be activated, activation of which has been thus kept waiting, when any direct memory access which has already been carried out finishes, and enough capacity is free in the common bus for the rate of using the bus calculated for the interface.

In this arrangement, for an interface, such as a network interface, for which it is not known when data is actually received, it is possible to reserve a necessary capacity of the bus which is to be used when data is received by the interface, and thereby, data transfer for the interface is not interfered with by other DMA.

It may be determined whether or not an interface can be activated, the interface being connected with the direct memory access controller and receiving data at an arbitrary timing to the system, a frequency at which the interface receives data being unknown until actually receiving data, Using a rate of using the bus calculated by using a maximum data transfer rate needed by direct memory access when data received by the interface is written in the memory under a condition where the interface receives data at a maximum frequency, the size of data which is transferred in one direct memory access operation or the size of data which the memory can accept, the latency for accessing the memory, and the latency for bus-right arbitration;

when it is determined that the interface can be activated, the rate of using the bus, calculated for the interface, may be added to the rate of using the bus at the present time by the data transfer performed by all the direct memory access controllers which have already started direct memory access until then and all the processors, and the interface may be activated;

when the interface is inactivated, the thus added rate of using the bus may be subtracted from the rate of using the bus at the present time;

activation of the interface may be kept waiting when it is determined that the interface cannot be activated; and the interface may be activated, activation of which has been thus kept waiting, when any direct memory access which has already been carried out finishes, and enough capacity is free in the common bus for the rate of using the bus calculated for the interface.

Thus, even under a condition where the data transfer rate of data reception is not known until the data reception is actually started from the interface, and, therefore, a capacity of the bus needed by DMA used for storing the received data in the memory cannot be previously known, the data can be completely stored in the memory even when the data is received at any frequency, because it is possible to reserve a free capacity of the bus for data transfer at the maximum data transfer rate.

When direct memory access for an interface, which is connected with the direct memory controller and performs an asynchronous data transfer, is newly requested to be started, a maximum data transfer rate which can be considered in accordance with a standard of a signal line of the interface may be used as the data transfer rate needed by the newly requested direct memory access.

Thus, for the asynchronous interface, although data transmission and reception are performed with handshaking, and, therefore, the data transfer rate varies depending on a particular device with which communication is performed, and a free capacity of the bus needed by DMA used for storing the data in the memory cannot be previously known, it is possible to completely store the data in the memory even when communication is performed with any device, because it is possible to reserve a free capacity of the bus used for data transfer at the maximum data transfer rate which can be considered in accordance with the standard of the interface. signal line.

When direct memory access for an interface, which is connected with the direct memory controller and performs an asynchronous data transfer, is newly requested to be started, the data transfer rate needed by the newly requested direct memory access is calculated by using information obtained from communication with a peripheral device which is connected with the system through the interface.

Thus, the data transfer rate of the interface can be calculated by using information such as the data transfer rate at which the peripheral device with which communication is performed through the asynchronous interface can perform data transmission and reception. Thereby, it is possible to perform a high-reliability calculation of the rate of using the bus.

The rate of using the bus by the data transfer performed by all the direct memory access controllers which have already started direct memory access and all the processors may be obtained from output of monitoring means which monitors busy time periods of the common bus.

Thus, because the rate of using the bus at the present time can be measured by using the output of the monitoring means, it is not necessary to calculate the rate of using the bus when data transfer performed by all DMA operations which have been already started until then and all the processors use the bus. Thus, it is possible to reduce a load borne by the processors.

The data transfer rate needed by the direct memory access and the size of data which is transferred in one direct memory access operation may be read from a non-volatile memory provided for the direct memory access controller which performs the direct memory access.

In this arrangement, information concerning the DMA for the interface can be read from the non-volatile memory such as a ROM connected with the DMAC. Further, in a case where the interface is connected with an I/O expansion board, information concerning the DMA for the interface can be read from the non-volatile memory such as a non-volatile ROM provided on the board. Thus, it is possible to obtain information concerning the.DMA appropriately even in a case where the system arrangement is changed.

Each of the processors may be provided with a bus interface circuit with a function of setting a rate of using the bus or a time period of using the bus per unit time period, and a function of causing bus access by the processor to be kept waiting in order to prevent an actual rate of using the bus by the processor from exceeding the set rate of using the bus or an actual time period of using the bus per unit time period by the processor from exceeding the set time period of using the bus per unit time period, the set rate of using the bus or the set time period of using the bus per unit time period being a fixed value or being determined in consideration of a current condition as to how the bus is used.

Generally speaking, because the rate of using the bus when each of the processors uses the bus depends on a program which is being executed, it is very difficult to strictly presume the rate of using the bus when each of the processors uses the bus at a point in time. However, in the above-described arrangement, it is possible to fix the rates of using the bus when the processors use the bus, respectively, and also, it is possible to guarantee that the actual rates of using the bus when the processors use the bus do not exceed the set rates of using the bus, respectively. As a result, it is possible to perform higher-reliability calculation of the rates of using the bus.

The bus interface circuit may comprise:

the setting means for setting the time period of using the bus per unit time period by the processor;

time measuring means for measuring the time period of using the bus during which the processor actually uses the bus per unit time period;

comparing means for comparing the time period of using the bus set by the setting means with the time period of using the bus measured by the time measuring means; and keeping waiting means for keeping a bus transaction requested from the processor waiting when the time period of using the bus set by the setting means is reached by the time period of using the bus measured by the time measuring means or it is determined that there is a high possibility that the time period of using the bus set by the setting means will be reached by the time period of using the bus measured by the time measuring means.

In this arrangement, the rates of using the bus when the processors use the bus, respectively, can be fixed.

When it is determined that the direct memory access, starting of which is newly requested, cannot be started, the request for starting the direct memory access may be managed by using a wait queue; and the order of the requests for starting the direct memory access may be changed in accordance with a priority order when the priority order is provided for interfaces using the direct memory access.

In this arrangement, when starting of a plurality of DMA operations is requested under a condition where not enough capacity is free in the common bus for starting DMA, the requests for starting the plurality of DMA operations are kept waiting in the order in which the requests were made, and management of the waiting requests for starting the plurality of DMA operations can be easily performed. Further, in a case where the priority is set for the interfaces, when starting of DMA for an interface having a high priority is requested, even under a condition where a request for starting a DMA for an interface having a low priority has already been kept waiting, the DMA for the interface having the high priority is started earlier than starting of the DMA for the interface having the low priority. Thereby, when data transfer for an interface is requested urgently, for example, it is possible to start the data transfer earlier.

A buffer area used by direct memory access for storing received data is allocated in the memory, wherein the buffer area may not be allocated in the memory when a request for starting direct memory access is kept waiting, and the buffer area may be allocated in the memory prior to setting of the direct memory access, which has been kept waiting, when the direct memory access is set as a result of finishing of other direct memory access.

Thus, allocation of the buffer area in the memory should be performed immediately prior to starting of DMA which uses the thus-allocated buffer memory. Thereby, it is possible to effectively use the memory.

In a data transfer control in accordance with another aspect of the present invention, for controlling data transfer by direct memory access performed by direct memory access controllers and continuous transfer of a large amount of data or periodic data transfer performed by processors in a system including the processors, the direct memory access controllers being connected with a common bus:

it is determined, when starting of data transfer is newly requested, whether or not the data transfer can be started, using a rate of using the bus at the present time by data transfer performed by all the direct memory access controllers which have already started direct memory access until then and all the processors, a data transfer rate needed by the newly requested data transfer by the processors, a size of data which is transferred in one data transfer operation or a size of data which a memory can accept, a latency for accessing the memory, and a latency for bus-right arbitration;

the newly requested data transfer is started when it is determined that the data transfer can be started;

starting of the newly requested data transfer is kept waiting when it is determined that the data transfer cannot be started; and the newly requested data transfer, which has been thus kept waiting, is started when any direct memory access or data transfer by the processors which has already been carried out finishes, and enough capacity is free in the common bus for carrying out the newly requested data transfer.

Thus, in a case where, for example, continuous data transfer such as that of a copying operation for copying a large amount of data, or data transfer performed as a result of a program being periodically executed, is newly requested, when enough capacity is not free in the common bus to be used by the newly requested data transfer, starting of the newly requested data transfer is kept waiting. Thereby, it can be prevented that data transfer cannot be guaranteed due to starting of newly requested data transfer when data transfer for an interface which needs data transfer of a fixed data transfer rate has already been started using the common bus. Thus, it is possible to guarantee data transfer at a necessary data transfer rate for each of the plurality of DMACs each of which needs the predetermined data transfer rate and is connected with the common bus.

Other objects and further features of the present invention will become more apparent from the following detailed description when read in conjunction with the accompanying drawings.

BRIEF DESCRIPTION OF THE DRAWINGS

FIG. 10 shows a flowchart of an interrupt process in the information processing apparatus shown in FIG. 8.

DETAILED DESCRIPTION OF THE PREFERRED EMBODIMENTS

Figure 1:
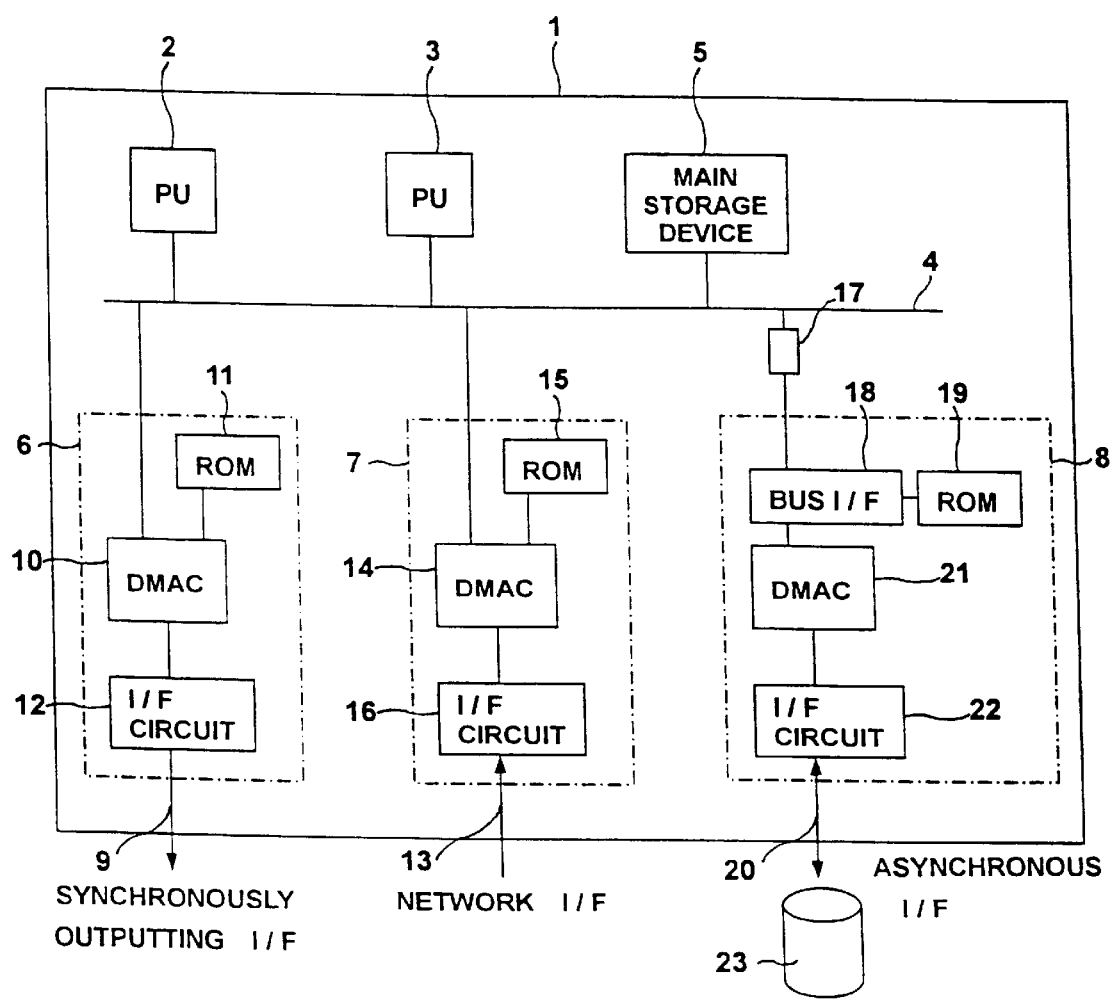
FIG. 1 show a block diagram of an information processing apparatus in a first embodiment of the present invention.

A first embodiment of the present invention will now be described with reference to FIGS. 1, 2 and 3. A data transfer control method in the first embodiment uses an information processing apparatus 1 shown in FIG. 1 as a hardware arrangement.

This information processing apparatus 1 is one computer system including two processors (PU) 2, 3. Each of the processors 2, 3 is a microcomputer including a CPU, a ROM and a RAM which are connected with the CPU via a bus. A main storage device 5 is connected with a common bus 4 with which the processors 2, 3 are connected. In addition, a plurality of interface modules (I/F modules) 6, 7 and an I/F board 8 are connected with the common bus 4.

The main storage device 5 includes a HDD (Hard Disc Drive), for example. The main storage device 5 may further include, if it is necessary, a FDD (Floppy Disk Drive) to which a floppy disk is loaded, a CD-ROM drive to which a CD-ROM is loaded, and so forth.

The I/F module 6 is a synchronously outputting I/F module. The I/F module 6 includes a DMAC 10 which reads data from the main storage device 5 using DMA, the thus-read data being output through a synchronously outputting I/F 9, a ROM (non-volatile memory) 11 connected with the DMAC 10, and a synchronously outputting I/F circuit 12 which controls the synchronously outputting I/F 9.

The I/F module 7 is a network I/F module. The I/F module 7 includes a DMAC 14 which writes data, received through a network I/F 13, in the main storage device 5 using DMA, a ROM (non-volatile memory) 15 connected with the DMAC 14, and a network I/F circuit 16 which controls the network I/F 13.

The I/F board 8 is an asynchronous I/F board, and is connected with the common bus 4 via an expansion slot 17. The I/F board 8 includes a bus I/F circuit 18 which controls an interface with the common bus 4 with which the board 8 is connected, a ROM (non-volatile memory) 19 which is connected with the bus I/F circuit 18 and provides information of the board 8, a DMAC 21 which reads data from the main storage device 5 using DMA, the thus-read data being transmitted through an asynchronous I/F 20, and writes data, received through the asynchronous I/F 20, in the main storage device 5 using DMA, and an asynchronous I/F circuit 22 which controls the asynchronous I/F 20. A secondary storage device 23 is connected with the asynchronous I/F board 8 via the asynchronous I/F 20.

The information processing apparatus 1 is provided with the RAM, HDD, floppy disk and so forth in the processors 2, 3 and main storage device 5, as data storage devices in which various kinds of data are temporarily stored. The information processing apparatus 1 is provided with the ROM, RAM, HDD, floppy disk, CD-ROM and so forth in the processors 2, 3 and main storage device 5, as information recording media which can provide software such as a previously recorded program and so forth to the CPUs of the processors 2, 3. The floppy disk and CD-ROM are not fixedly provided in the information processing apparatus 1 but are replaceable information recording media each of which can be handled separately. The CPU of each of the processors 2, 3 performs various processing operations in accordance with a control program which is previously set in the replaceable information recording medium such as the floppy disk, CD-ROM or the like. Such a control program is stored in the CD-ROM, the information stored therein being read by the CD-ROM drive, or is previously installed in the HDD. In either case, when the information processing apparatus 1 is started, such a control program is copied to the RAM of each of the processors 2, 3, is read by the CPU, and thus, the various processing operations are performed thereby.

Figure 2:
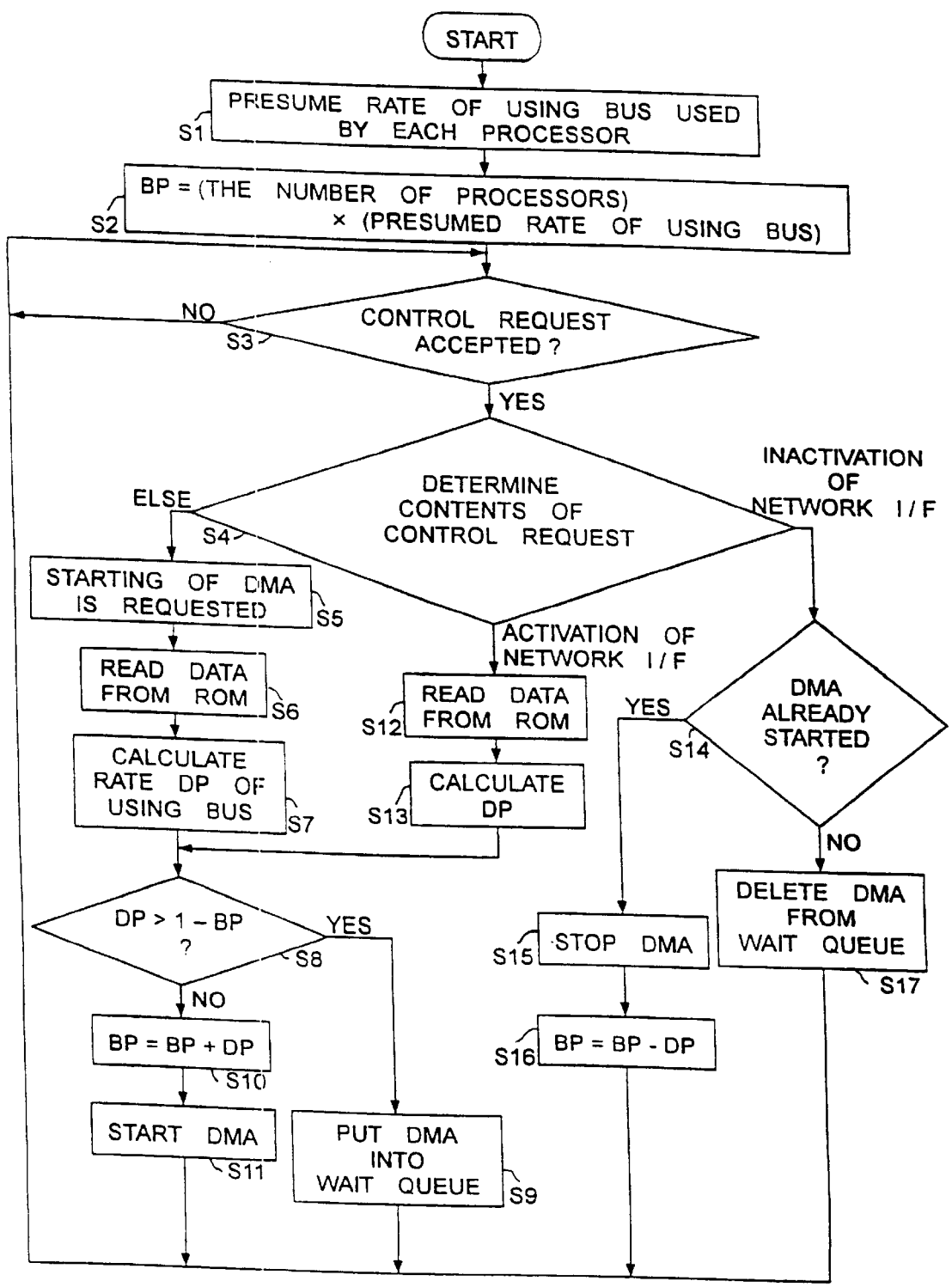
FIG. 2 shows a flowchart of a data transfer control process in the information processing apparatus show in FIG. 1.
Figure 3:
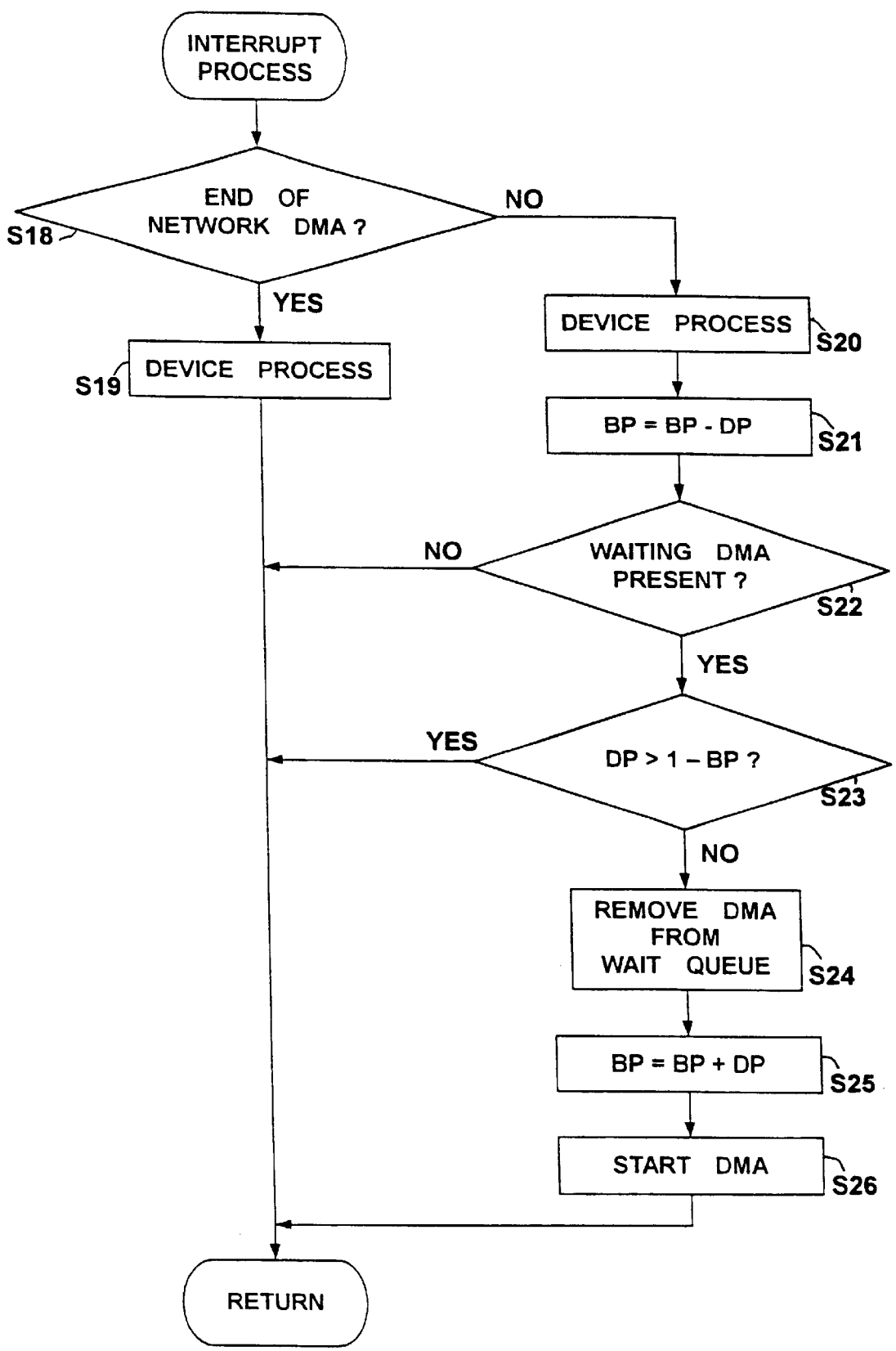
FIG. 3 shows a flowchart of an interrupt process in the information processing apparatus shown in FIG. 1.

The data transfer control method in the information processing apparatus 1 will now be described with reference to FIGS. 2 and 3 showing flowcharts. When the system is started up, a rate of using the bus when each of the processors 2, 3 uses the bus is presumed (in a step S1), the number of the processors 2, 3 (in this case, two) connected with the common bus 4 is multiplied by the thus-presumed rate of using the bus, and thus, the rate of using the bus when all the processors 2, 3 use the bus is calculated (in a step S2). The thus-calculated rate of using the bus is referred to as BP. Then, a control request made for an interface by an application program or a system control program is waited for (in a step S3), and the control request is accepted when the control request is made. When the control request is accepted (Yes of the step S3), the contents of the control request are determined (in a step S4).

When it is determined as a result of the determination in the step S4 that the control request requests data transfer in an interface, after starting up of DMA is requested by the device driver which controls the interface (in a step S5), the data transfer rate needed by the DMA and the size of data which is transferred in one DMA operation are read from the ROM 11, 15 or 19 which is placed at a fixed address of the I/F module 6, 7 or 8 (in a step S6). There, the ROM may or may not be physically connected with the DMAC (In this embodiment, although the ROMs 11, 15 are connected with the DMACs 10, 14, respectively, the ROM 19 is connected with the DMAC 21 via the bus I/F circuit 18). Further, the data transfer rate needed by DMA is the data transfer rate in the synchronously outputting I/F 9, in DMA for the synchronously outputting I/F 9. The data transfer rate needed by DMA is the data transfer rate which is the maximum one which can be considered in accordance with the standard of the interface signal line, in DMA for the asynchronous I/F 20. Then, from the data thus read from the ROM, the latency for accessing the memory which is fixed to the system and the latency for bus-right arbitration, the rate DP of using the bus when the interface for the data transfer uses the bus is calculated (in a step S7).

Then, it is determined whether $$DP>1-BP$$

holds (in a step S8) where BP is the rate of using the bus when all DMA operations which have already been started until this time and all the processors 2, 3 use the bus and DP is the rate of using the bus calculated in the step S7. Thus, it is determined whether or not the newly requested DMA can be started.

When DP>1−BP holds (Yes of the step S8), it is determined that the newly requested DMA cannot be started, and the request for starting of this DMA is put into a wait queue (in the step S9), and an interrupt process, to be described later, is waited for.

On the other hand, when DP>1−BP does not hold (No of the step S8), it is determined that the newly requested DMA can be started, and the rate BP of using the bus is updated as a result of the rate DP of using the bus, calculated in the step S7, being added to the rate BP of using the bus (in a step S10). After the rate BP of using the bus is updated, the newly requested DMA is started (in a step S11).

When it is determined in the step S4 that the accepted control request activates the network I/F 13, the data transfer rate needed by DMA for completely writing received data in the memory when the data is received in the maximum frequency of the network and the size of data which is transferred in one DMA operation are read from the ROM 15 placed at a fixed address in the network I/F module 7 (in a step S12), and, similar to the case of the step S7, the rate DP of using the common bus 4 for data transfer by, DMA for the network I/F 13 is calculated (in a step S13). After the rate DP of using the common bus 4 is calculated, similar to the above-described case, the determination in the step S8 is performed. In the determination in this case, it is determined whether or not the interface can be activated. When it is determined that the interface can be activated (No of the step S8), the step S10 is performed, the interface is activated and the step S11 is performed. When it is determined that the interface cannot be activated (Yes of the step S8), the activation of the interface is kept waiting (in a step S9).

When it is determined in the step S4 that the accepted control request inactivates the network I/F 13, it is determined in a step S14 whether DMA for the network I/F 13 has already been started. When it is determined that DMA for the network I/F 13 has already been started (Yes of the step S14), this DMA is stopped (in a step S15), and the rate BP of using the bus is updated as a result of the rate DP of using the bus, which was calculated when this DMA was started and was added to the rate BP of using the bus, being subtracted from the BP. When it is determined that DMA for the network I/F 13 has not been started yet (No of the step S14), the request for starting DMA present in the wait queue is deleted (in a step S17).

Further, in an interrupt process which is performed when already started DMA is finished (see FIG. 3), it is determined whether or not the interrupt process is an interrupt process which is performed when already started DMA for the network I/F 13 (in a step S18) is finished. When it is determined that the interrupt process is an interrupt process which is performed when already started DMA for the network I/F 13 is finished (Yes in the step S18), a device control process is performed in an interrupt process routine of the device driver of the network I/F 13 (in a step S19). When it is determined that the interrupt process is an interrupt process which is performed when already started DMA for an interface other than the network I/F 13 is finished (No in the step S18), a device control process is performed in an interrupt process routine of the device driver of the interface (in a step S20). Then, the rate BP of using the bus is updated as a result of the rate DP of using the bus, which was calculated when this DMA was started and was added to the rate BP of using the bus, being subtracted from the BP (in a step S21).

Then, it is determined whether or not a request for starting DMA is present in the wait queue (in a step S22). When it is determined that a request for starting DMA is present in the wait queue (Yes in the step S22), the rate DP of using the bus is calculated for the DMA which is present at the top of the wait queue, and it is determined whether or not $$DP>1-BP$$

holds, where DP is the rate DP of using the bus calculated for the DMA present at the top of the wait queue. and BP is the rate BP of using the bus updated in the step S21 (in a step S23). Thus, it is determined whether or not there is a free capacity of the bus to be used for starting the DMA. When it is determined that DP>1−BP does not hold (No in the step S23), it is determined that a free capacity is present in the common bus 4 which can be used for the DMA present at the top of the wait queue. Then, the request for starting this DMA is deleted from the wait queue (in a step S24), and the rate BP of using the bus is updated as a result of the rate DP of using the bus calculated for this DMA being added to the rate BP of using the bus (in a step S25). Then, this DMA is started (in a step S26). When the DMA present at the top of the wait queue is DMA for the network I/F 13, activation of the network 13, which has been kept waiting, is performed.

In the above-described first embodiment of the present invention, when data transfer for an interface is newly requested by an application program, a system control program or the like, and starting of DMA for the interface ig newly requested, and when the newly requested DMA for the interface cannot be started in consideration of the capacity of the common bus 4, the starting of the newly requested DMA is kept waiting. Thereby, it can be prevented that data transfer cannot be guaranteed due to starting of the newly requested DMA even when the data transfer for an interface which needs data transfer of a fixed data transfer rate has already been started using the common bus 4. Thus, it is possible to guarantee data transfer at a necessary data transfer rate for each of the plurality of DMACs 10, 14, 21 each of which needs the predetermined data transfer rate and is connected with the common bus 4. Further, the rate BP of using the bus at the present time which is used for determining whether newly requested starting of DMA can be permitted can be easily calculated based on the number of the processors 2, 3 and the presumed rate of using the bus when each processor uses the bus, and information concerning DMA which has already been started. As a result, it is not necessary to change the hardware arrangement to incorporate a special circuit for this purpose.

Further, with regard to the network I/F 13, even under a condition where the data transfer rate of data reception is not known until the data reception is actually started from the interface, and, therefore, a capacity of the bus needed by DMA used for storing the received data in the memory cannot be previously known, the data can be completely stored in the memory even when the data is received at any frequency, because it is possible to reserve the capacity of the bus to be used for data transfer at the maximum data transfer rate.

Further, for the asynchronous I/F 20, where data transmission and reception are performed with handshaking, and, thus, the data transfer rate varies depending on a particular device with which communication is performed, and a capacity of the bus needed by DMA used for storing the data in the memory cannot be previously known, it is possible to completely store the data in the memory even when communication is performed with any device, because it is possible to reserve the capacity of the bus used for data transfer at the maximum data transfer rate which can be considered in accordance with the standard of the interface signal line.

Figure 4:
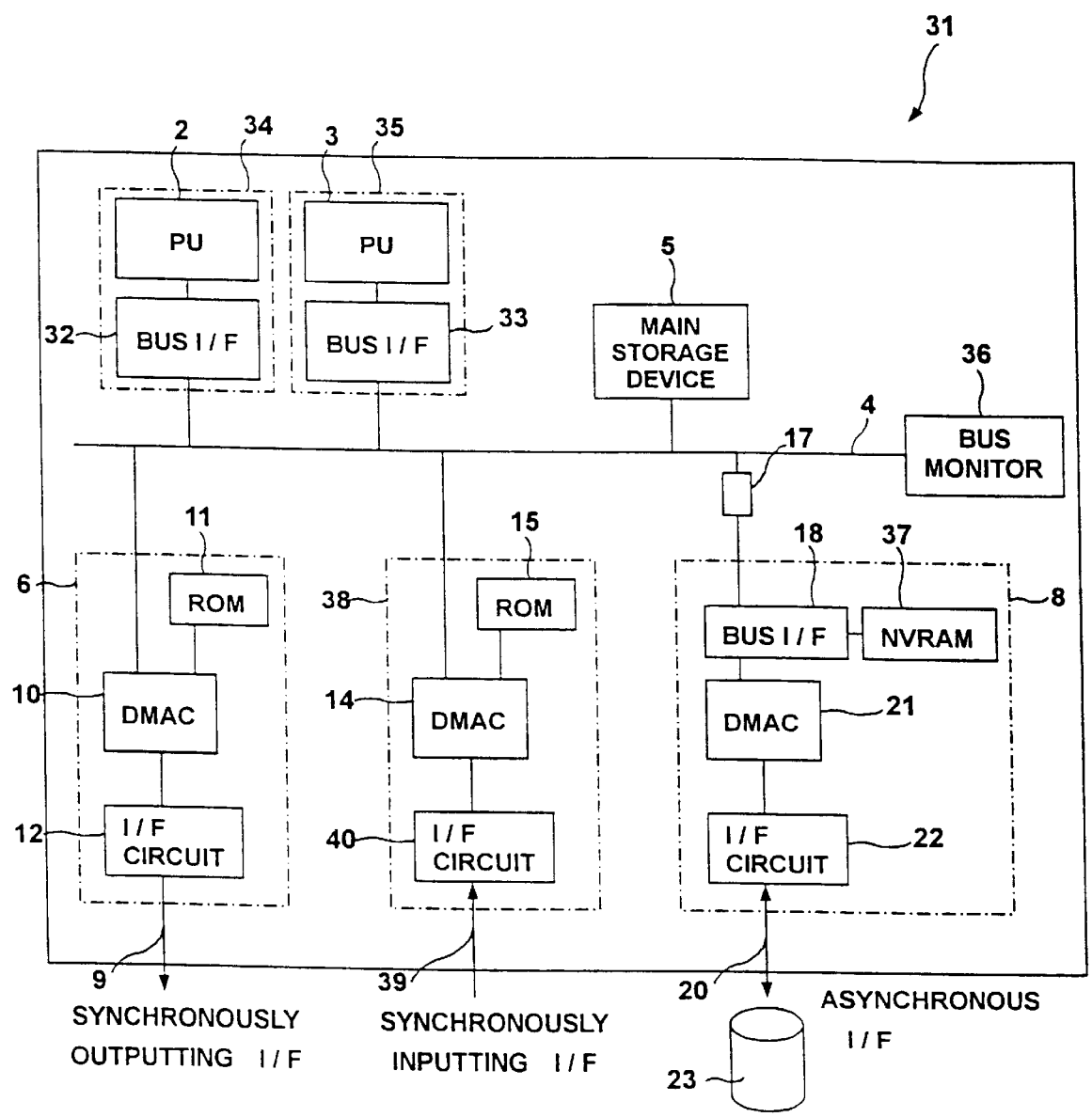
FIG. 4 shows a block diagram of an information processing apparatus in a second embodiment of the present invention.

A second embodiment of the present invention will now be described with reference to FIGS. 4, 5 and 6. The same reference numerals are given to parts which are the same as those of the first embodiment, and descriptions thereof will be omitted. (Such a manner is the same as a manner in which a fourth embodiment to be described later will be described.) A data transfer control method in the second embodiment uses an information processing apparatus 31 shown in FIG. 4 as a hardware arrangement.

This information processing apparatus 31 is also one computer system. In the second embodiment, processor unit modules 34, 35 which include bus I/F circuits 32, 33 for the processors 2, 3, respectively are used. Each of the bus I/F circuits 32, 33 is connected with the common bus 4 and controls an interface with the bus. Each of the bus I/F circuits 32, 33 includes setting means for setting a rate of using the bus when a respective one of the processors 2, 3 uses the common bus 4, and wait inserting means for inserting a wait for accessing the bus by the respective one of the processors 2, 3 so as to prevent the thus-set rate of using the bus from being exceeded. (Alternatively, as in a third embodiment to be described later, each of the bus I/F circuits 32, 33 includes setting means for setting a time period of using the bus per a unit time period when a respective one of the processors 2, 3 uses the common bus 4, and wait inserting means for inserting a wait for accessing the bus by the respective one of the processors 2, 3 so as to prevent the thus-set time period of using the bus per unit time period when the respective one of the processors 2, 3 uses the common bus 4 from being exceeded.)

Further, a bus monitor 36 is connected with the common bus 4 acting as monitoring means for monitoring busy time periods of the common bus 4 in order to measure the rate of using the bus when the DMACs 10, 14, 21 connected with the common bus 4 use the bus.

Further, in the asynchronous I/F board 8, in the second embodiment, a non-volatile RAM (NVRAM) 37 is connected with the bus I/F circuit 18 instead of the ROM 19. Further, a synchronously inputting I/F module 38 is provided instead of the network I/F module 7, and a synchronously inputting I/F circuit 40 is provided which controls a synchronously inputting I/F 39.

Figure 5:
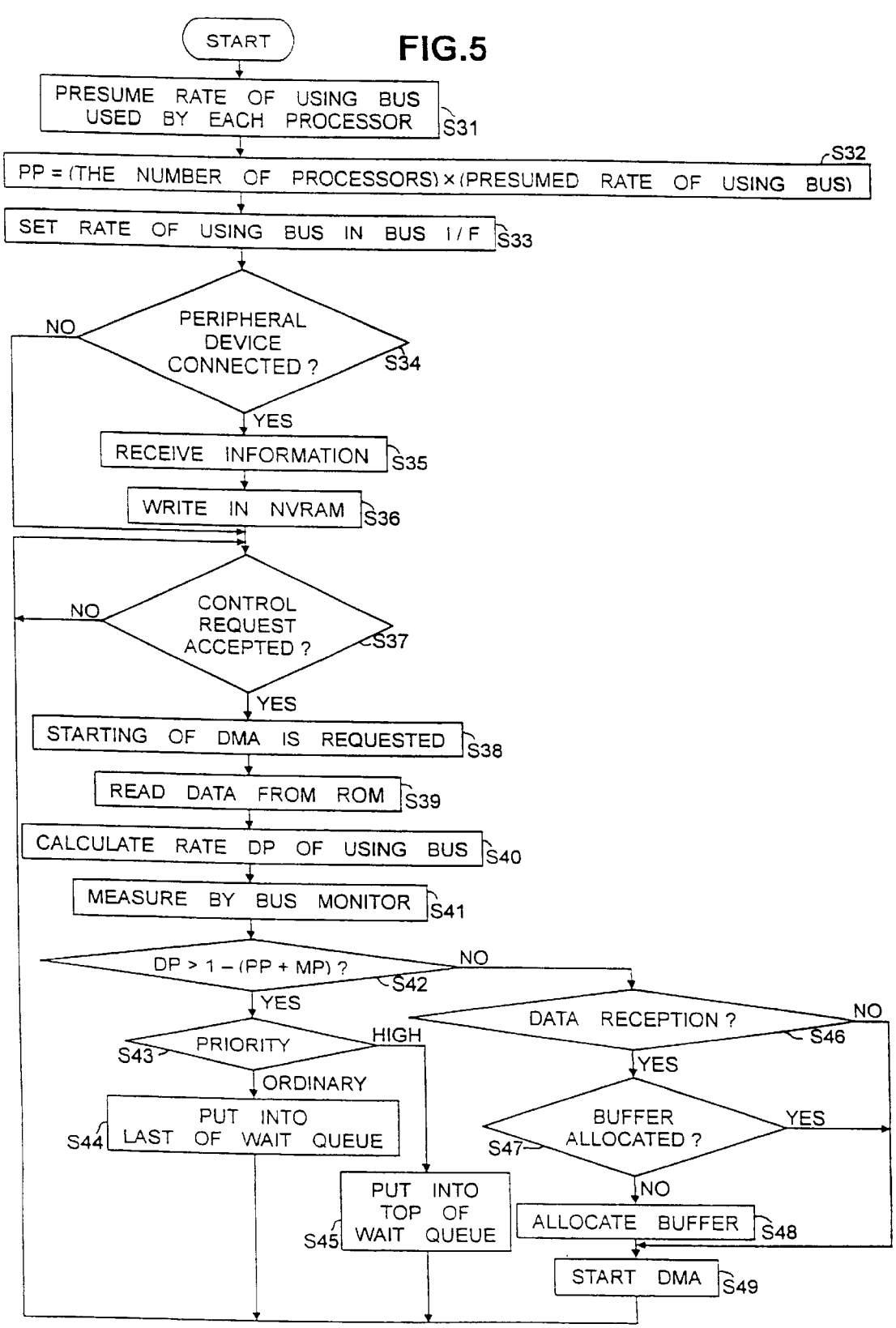
FIG. 5 shows a flowchart of a data transfer control process in the information processing apparatus shown in FIG. 4.
Figure 6:
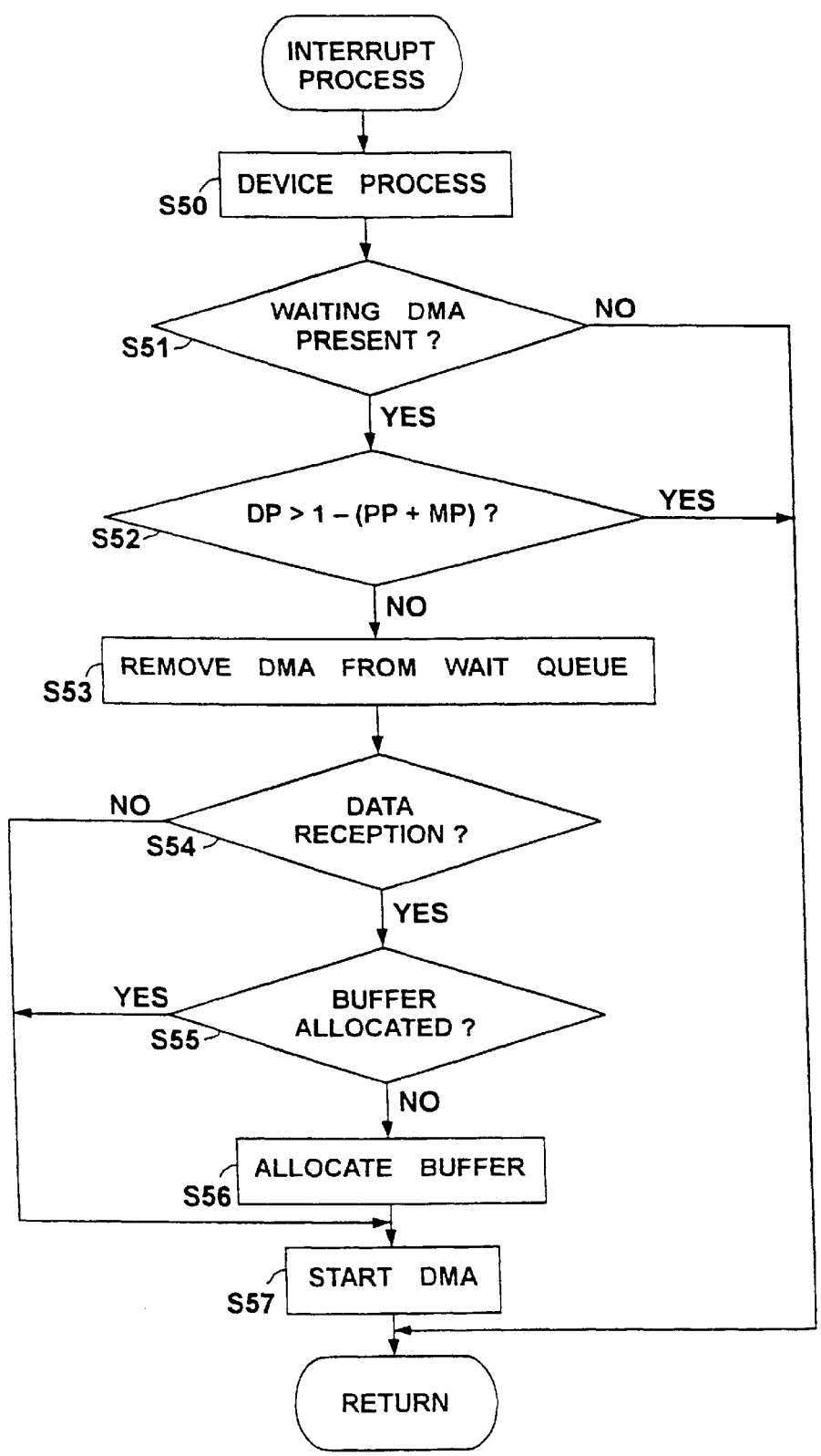
FIG. 6 shows a flowchart of an interrupt process in the information processing apparatus shown in FIG. 4.

The data transfer control method in the information processing apparatus 31 will now be described with reference to FIGS. 5 and 6 showing flowcharts. When the system is started up, the rate of using the bus when each of the processors 2, 3 uses the bus is presumed (in a step S31), the number of the processors 2, 3 (in this case, two) connected with the common bus 4 is multiplied by the thus-presumed rate of using the bus, and thus, the rate of using the bus when the all the processors 2, 3 use the bus is calculated (in a step S32). The thus-calculated rate of using the bus is referred to as PP. After the calculation, the rates of using the bus, presumed in the step S31, are set in internal registers of the bus I/F circuits 32, 33 of the processor unit modules 34, 35, respectively (in a step S33).

Then, it is determined whether or not a peripheral device such as the secondary storage device 23 is connected with the asynchronous I/F 20 (in a step S34). When it is determined that the peripheral device is connected with the asynchronous I/F 20 (Yes in the step S34), communication is performed with the peripheral device, and information such as the data transfer rate at which the peripheral device can perform data transfer is received (in a step S35). The thus-received information such as the data transfer rate is written in the non-volatile RAM 37 on the asynchronous I/F board 8 (in a step S36).

Then, a control request made for an interface by an application program or a system control program is waited for (in a step S37). When the control request is made, the device driver which controls the interface accepts the control request (in a step S38). When starting of DMA is thus requested, the data transfer rate needed by the DMA and the size of data to be transferred in one DMA operation are read from the ROM 11, 15 or the non-volatile RAM 37 placed on a fixed address in the I/F module 6, 38 or 8 (in a step S39). In a case where the DMA, starting of which is requested, is DMA for the asynchronous I/F 20, the data transfer rate needed by the DMA is the data transfer rate at which the peripheral device connected with the asynchronous I/F 20 can perform data transfer. Then, from the data thus read from the ROM or the like, the latency for accessing the memory fixed to the system and the latency for bus-right arbitration, the rate DP of using the bus when the data transfer for the interface uses the bus is calculated (in a step S40). Further, the rate MP of using the bus when all DMA operations which have been already started until this time use the bus is measured by the bus monitor 36 (in a step S41).

Then, whether or not the newly requested starting of the DMA can be permitted is determined as a result of determining whether or not $$DP > 1-(PP+MP)$$

holds (in a step S42), where MP is the rate MP of using the bus when all DMA operations which have been already started until this time use the bus, PP is the rate PP of using the bus when the all the processors 2, 3 use the bus and DP is the above-mentioned calculated rate DP of using the bus.

Then, when it is determined that DP>1−(PP+MP) holds (Yes in the step S42), it is determined that starting of the DMA is not possible, starting of this DMA is put into the wait queue (in steps S44, S45), and the interrupt process, to be described later, is waited for. Before starting of the DMA is put into the wait queue, the priority of the interface is checked (in a step S43). When the priority of the interface is an ordinary one ('ordinary' in the step S43), starting of the DMA is put into the bottom of the wait queue (in the step S44). When the priority of the interface is a high one ('high' in the step S43), starting of this DMA is put into the top of the wait queue (in the step S45).

On the other hand, when it is determined that DP>1−(PP+MP) does not hold (No in the step S42), it is determined that starting of the DMA is possible. Then, it is determined whether or not the interface receives data (in a step S46). When it is determined that the interface receives data (Yes in the step S46), it is determined whether or not a buffer area for storing data to be received has already been allocated in the memory (in a step S47). When it is determined that the buffer area has already been allocated (Yes in the step S47), the DMA, starting of which is requested, is started (in a step S49). When it is determined that the buffer area has not been allocated yet (No in the step S47), the buffer area having the necessary size is allocated in the memory (in a. step S48). Then, the DMA, starting of which is requested, is started (in the step S49). Thus, when starting of the DMA, which is requested, is kept waiting, the buffer area for storing data to be received is not allocated in the memory. Then, when other DMA is finished and the DMA, starting of which has been kept waiting, is set, the buffer area for storing data to be received is allocated in the memory prior to setting of the DMA.

In the interrupt process performed when already started DMA for an interface is finished (see FIG. 6), the device control process is performed in the interrupt process routine of the device driver for the interface (in a step S50). Then it is determined whether or not a request for starting DMA is present in the wait queue (in a step S51). When it is determined that a request for starting DMA is present in the wait queue (Yes in the step S51), the rate DP of using the bus is calculated for the DMA, request for starting of which is present at the top of the wait queue. Then, it is determined (in a step S52) whether or not $$DP>1-(PP+MP)$$

holds, where DP is the above-mentioned calculated rate DP of using the bus, PP is the above-mentioned calculated rate PP of using the bus and MP is the above-mentioned measured rate MP of using the bus. Thereby, it is determined whether enough capacity is free in the common bus 4 to be used by the DMA, request for starting of which is present at the top of the wait queue. When it is determined that DP>1−(PP+MP) does not hold (No in the step S52), and, as a result, it is determined that enough capacity is free in the common bus 4 to be used by the DMA, request for starting of which is present at the top of the wait queue, the request for starting this DMA is deleted from the wait queue (in a step S53). Then, it is determined whether or not the interface receives data (in a step S54). When it is determined that. the interface receives data (Yes in the step S54), it is determined whether or not a buffer area for storing data to be received has already been allocated in the memory (in a step S55). When it is determined that the buffer area has already been allocated (Yes in the step S55), the DMA, request for starting which was present at the top of the wait queue and has been deleted therefrom as mentioned above, is started (in a step S57). When it is determined that the buffer area has not been allocated yet (No in the step S55), the buffer area having the necessary size is allocated in the memory (in a step S56). Then, the DMA, request for starting which was present at the top of the wait queue and has been deleted as mentioned above, is started (in the step S57).

In the second embodiment, the rate PP of using the bus when the all the processors 2, 3 use the bus is calculated, and the rate MP of using the bus when all DMA operations which have been already started until this time use the bus is measured by the bus monitor 36. However, it is also possible that both the rate PP of using the bus when the all the processors 2, 3 use the bus and the rate MP of using the bus when all DMA operations which have been already started until this time use the bus are measured by the bus monitor 36. In this arrangement, it is not necessary to calculate the rate PP of using the bus when the all the processors 2, 3 use the bus, and thereby, it is possible to reduce a load borne by the processors.

Also in the above-described second embodiment of the present invention, when data transfer at an interface is newly requested by an application program, a system control program or the like, and starting of DMA for the interface is newly requested, and when the newly requested DMA for the interface cannot be started in consideration of the capacity of the common bus 4, the starting of the newly requested DMA is kept waiting. Thereby, it can be prevented that data transfer cannot be guaranteed due to starting of newly requested DMA when the data transfer for an interface which needs data transfer of a fixed data transfer rate has been already started using the common bus 4. Thus, it is possible to guarantee data transfer at a necessary data transfer rate for each of the plurality of DMACs 10, 14, 21 each of which needs the predetermined data transfer rate and is connected with the common bus 4.

Further, the data transfer rate of the interface is calculated by using information such as the data transfer rate at which the peripheral devices such as the secondary storage device 23, with which communication is performed through the asynchronous I/F 20 can perform data transmission and reception. Thereby, it is possible to perform a high-reliability calculation of the rate of using the bus. Further, because the rate MP of using the bus at the present time can be measured by using the bus monitor 36, it is not necessary to calculate the rate MP of using the bus when data transfer performed by all DMA operations which have been already started uses the bus. Thus, it is possible to reduce a load borne by the processors 2, 3.

Further, information concerning DMA for the respective interfaces 9, 39 can be read from the non-volatile memories such as the ROMs 11, 15 connected with the DMACs 10, 14, respectively. Further, the interface 20 is connected with the I/O expansion board 8. In this case, information concerning DMA for the interface 20 can be read from the non-volatile memory such as the non-volatile memory 37 provided on the board 8. Thus, it is possible to obtain information concerning DMA appropriately even in a case where the system arrangement is changed.

Further, generally speaking, because the rate of using the bus when each of the processors 2, 3 uses the bus depends on a program which is being executed, it is very difficult to strictly presume the rate of using the bus when each of the processors 2, 3 uses the bus at a point in time. However, in the second embodiment, the processors 2, 3 include the bus I/F circuits 32, 33, respectively, and the rates of using the bus are previously set in the bus I/F circuits 32 for the processors 2, 3, respectively. Thereby, it is possible to fix the rates of using the bus when the processors 2, 3 use the bus, respectively, and also, it is possible to guarantee that the actual rates of using the bus when the processors 2, 3 use the bus does not exceed the set rates of using the bus, respectively. As a result, it is possible to perform a higher-reliability calculation of the rates of using the bus.

Further, when starting of a plurality of DMA operations is requested under a condition where not enough capacity is free in the common bus 4 for starting DMA operations, the requests for starting the plurality of DMA operations are kept waiting in the order in which the requests were made, and management of the waiting requests for starting the plurality of DMA operations can be easily performed. Further, in a case where priorities are set for the interfaces, even under a condition where a request for starting DMA for an interface having a low priority has already been kept waiting, when starting of DMA for an interface having a high priority is requested, this DMA is started earlier than starting of the DMA for the interface having the low priority. Thereby, when data transfer for an interface is requested urgently, for example, it is possible to start the data transfer earlier.

Further, allocation of the buffer area in the memory should be performed immediately prior to starting of DMA which uses the thus-allocated buffer memory. Thereby, it is possible to effectively use the memory.

Figure 7:
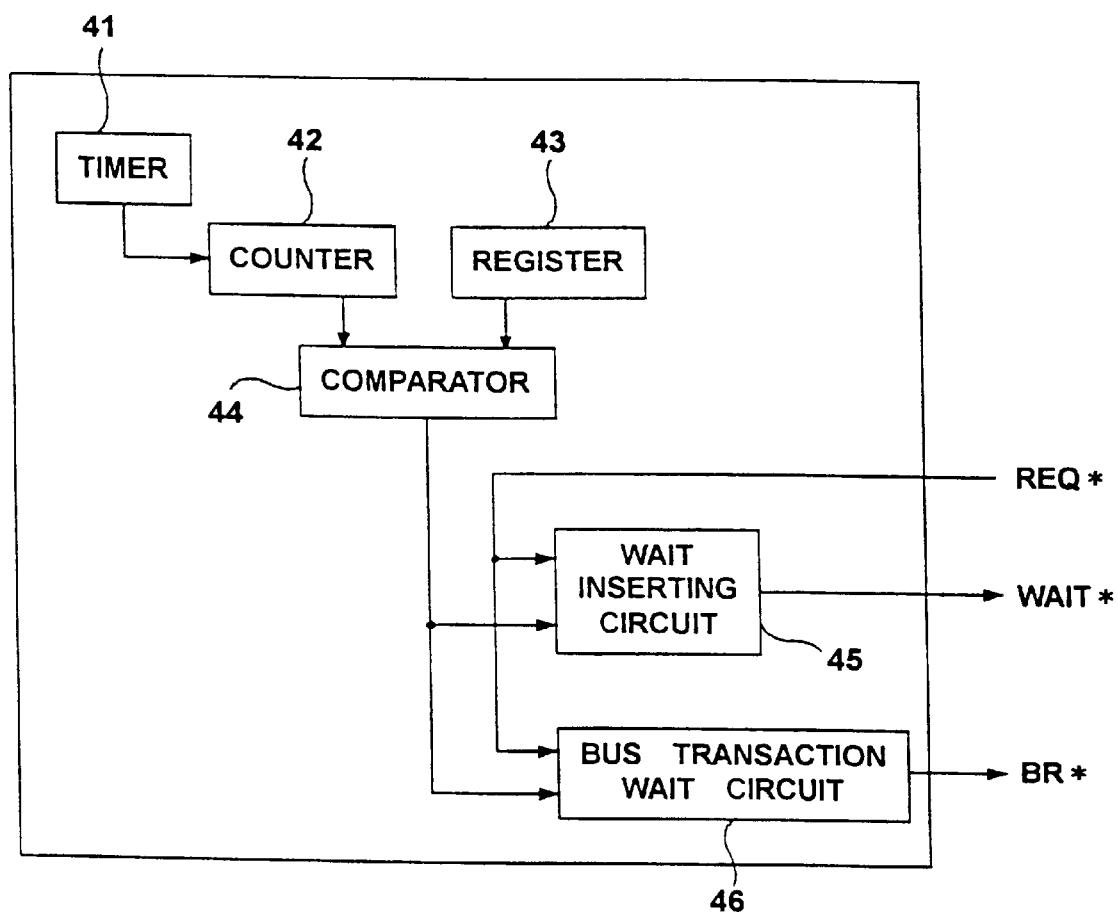
FIG. 7 shows a block diagram of a bus I/F circuit in a third embodiment of the present invention.

The third embodiment of the present invention will now be described with reference to FIG. 7. The third embodiment relates to an arrangement of each of the bus I/F circuits 32, 33 used in the processor unit modules 34, 35, respectively.

The bus I/F circuit 32 (or 33) includes a timer 41, a counter 42, a register 43, a comparator 44, a wait inserting circuit 45 and a bus transaction wait circuit 46. The timer 41 measures a unit time period. The counter 42 cumulatively measures time periods each starting when the processor 2 (or 3) receives a bus right and ending when a bus transaction is finished. The thus-cumulatively measured time periods are canceled each time the unit time period measured by the timer 41 has elapsed. The register 43 has a time period of using the bus when the processor 2 (or 3) uses the bus per unit time period set therein. The comparator 44 compares the time period of using the bus set in the register 43 with an actual time period of using the bus measured by the counter 42. The wait inserting circuit 45 inserts a wait by a WAIT* signal when a bus transaction is requested by a REQ* signal from the processor 2 (or 3) during a time during which a comparison result signal is active. The comparison result signal output from the comparator 44 is active when the actual time period of using the bus has reached the set time period of using the bus. The bus transaction wait circuit 46 masks a bus-right request signal BR* for the bus transaction so as to keep the transaction waiting during the time during which the comparison result signal output from the comparator 44 is active.

Functions of the bus I/F circuit 32 (or 33) in the third embodiment will now be described. Similar to the first and second embodiments, the rate of using the bus when the processor 2 (or 3) uses the bus is presumed when the system is started up. Then, from the thus-presumed rate of using the bus and the unit time period of the bus I/F circuit 32 (or 33), the time period of using the bus per unit time period is calculated. Then, a certain time period is subtracted from the thus-calculated time period of using the bus per unit time period in consideration of an evaluation error, the thus-obtained result is converted into the number of clock pulses, the clock pulses being given to the bus I/F circuit 32 (or 33) by a clock signal CLK, and the thus-obtained number of clock pulses is set in the register 43.

Then, the timer 41 counts the clock pulses given by the clock signal CLK, and outputs a clear signal to the counter 42 each time the unit time has elapsed. By the clear signal, the count value of the counter 42 is returned to zero. The count value of the counter 42 is incremented in synchronization with the clock signal CLK during each of time periods each starting when the processor 2 (or 3) receives the bus right and ending when the bus transaction is finished, and, the counter 42 counts the total time period during which the processor 2 (or 3) uses the bus, during a time period starting when the count value is returned to zero by the clear signal and ending when the count value is returned to zero again by the clear signal. When the bus transaction is newly requested by the REQ* signal from the processor 2 (or 3), and when the comparison result signal is active, thus indicating that the count value of the counter 42 has reached the value set in the register 43 (the time periods of using the bus), the wait inserting circuit 45 asserts the WAIT* signal to be sent to the processor 2 (or 3). At the same time, during the time period during which the count value of the counter 42 is equal to the set value set in the register 43, the bus transaction wait circuit 46 masks the signal BR* which requests the bus right. Then, when the unit time period measured by the timer 41 has elapsed, the count value of the counter 42 is returned to zero and the comparison result signal of the comparator 44 is inactivated, the WAIT* signal is deasserted by the wait inserting circuit 45, and masking of the bus-right request signal BR* by the bus transaction wait circuit 46 is canceled, and the bus transaction wait circuit 46 asserts the bus-right request signal BR*. Thereby, the bus transaction is started.

It is also possible that the comparison result signal of the comparator 44 is activated when it is determined that there is a high possibility that the count value of the counter 42 will reach the set value set in the register 43.

Thus, in the third embodiment, by the bus I/F circuits 32, 33, it is possible to fix the rates of using the bus when the processors 2, 3 use the bus, respectively, and it is possible to perform high-reliability calculation of the rates of using the bus.

Figure 8:
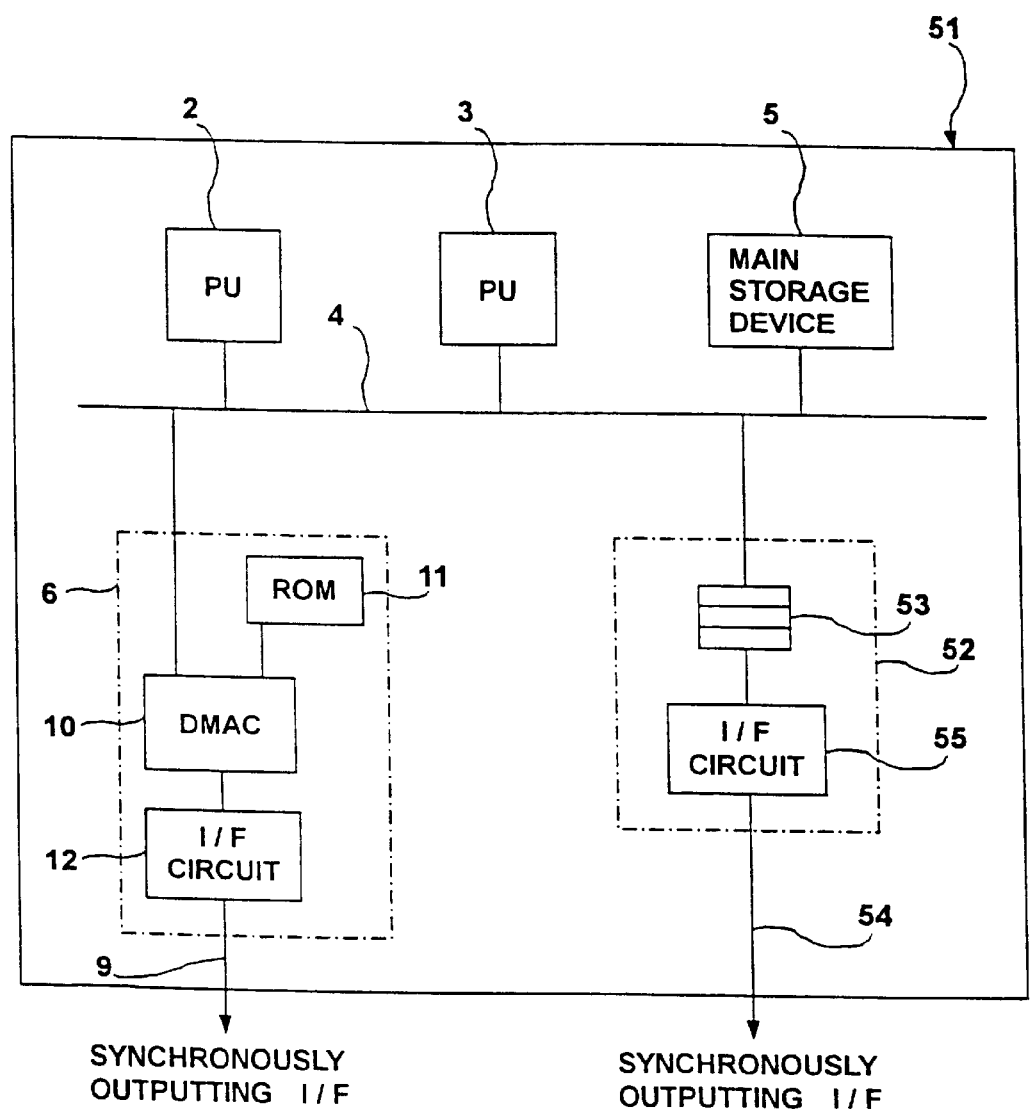
FIG. 8 shows a block diagram of an information processing apparatus in a fourth embodiment of the present invention.

The fourth embodiment of the present invention will now be described with reference to FIGS. 8, 9 and 10. A data transfer control method in the fourth embodiment uses an information processing apparatus 51 shown in FIG. 8 as a hardware arrangement.

The information processing apparatus 51 is also one computer system. In the fourth embodiment, two synchronously outputting I/F modules 6, 52 are connected with the common bus 4. The synchronously outputting I/F module 6 is the same as that in the first and second embodiments. The synchronously outputting I/F module 52 includes a data outputting FIFO (First-In First-Out memory) 53 to which data is written by the processor 2 or 3, and a synchronously outputting I/F circuit 55 which controls a synchronously outputting I/F 54.

Figure 9:
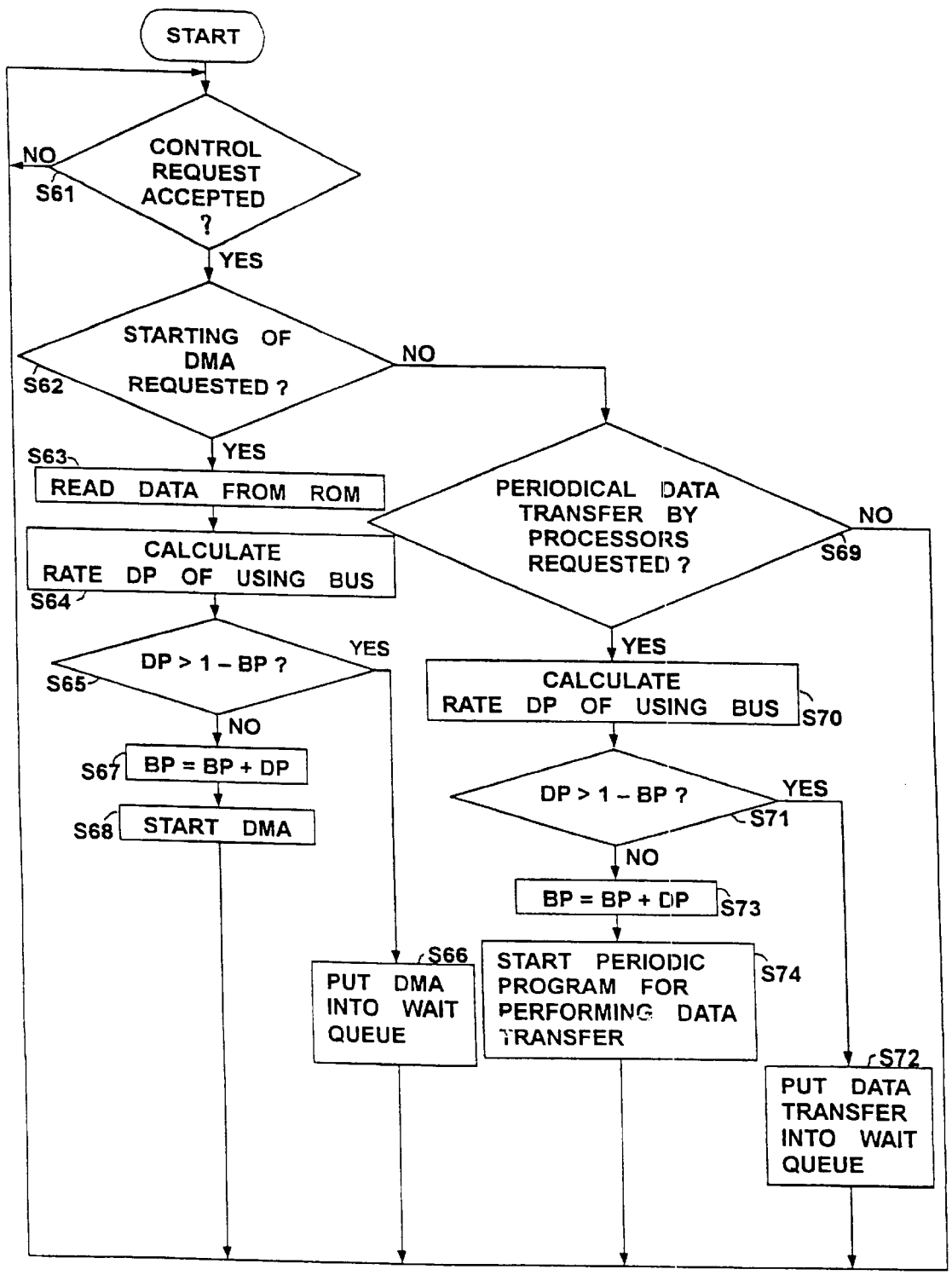
FIG. 9 shows a flowchart of a data transfer control process in the information processing apparatus shown in FIG. 8.

The data transfer control method in the information processing apparatus 51 will now be described with reference to FIGS. 9 and 10 showing flowcharts. First, a control request for an interface by an application program is waited for (in a step S61). When a control request for an interface is made (Yes in the step S61), and when a request for starting DMA is made by the device driver which controls the interface (Yes in a step S62), the data transfer rate needed by the DMA and the size of data which is transferred in one DMA operation are read from the ROM 11 placed at the fixed address in the synchronously outputting I/F module 6 (in a step S63). From the data thus read from the ROM, the latency for accessing the memory which is fixed to the system and the latency for bus-right arbitration, the rate DP of using the bus when the interface for the data transfer uses the common bus 4 is calculated (in a step S64).

Then, it is determined whether $$DP > 1 - BP$$

holds (in a step S65) where BP is the rate of using the bus when all DMA operations which have been already started until this time and all the processors 2, 3 use the bus, and DP is the rate of using the bus calculated in the step S64. Thus, it is determined whether or not the newly requested DMA can be started. When it is determined that DP>1−BP holds (Yes in the step S65), it is determined that starting of the DMA is not possible. Then, the request for starting the DMA is put into the wait queue (in a step S66). Then, the interrupt process, to be described later, is waited for.

When it is determined that DP>1−BP does not hold (No in the step S65), it is determined that starting of the DMA is possible. Then, the rate BP of using the bus is updated as a result of the currently calculated rate DP of using the bus being added to the rate BP of using the bus (in a step S67). Then, the DMA, starting of which is newly requested, is started (in a step S68).

When a control request is made (Yes in the step S61) but starting of DMA is not requested (No in the step S62), it is determined whether or not periodic data transfer by the processors 2, 3 is requested by the device driver of the interface 54 (in a step S69). When periodic data transfer is requested (Yes in the step S69), from the data transfer rate needed by this data transfer, the latency for accessing the memory which is fixed to the system and the latency for bus-right arbitration, the rate DP of using the bus when this data transfer uses the common bus 4 is calculated (in a step S70).

Then, it is determined whether $$DP > 1 - BP$$

holds (in a step S71) where BP is the rate of using the bus when all DMA operations which have been already started until this time and all the processors 2, 3 use the bus, and DP is the rate of using the bus calculated in the step S70. Thus, it is determined whether or not the newly requested data transfer can be started. When it is determined that DP>1−BP holds (Yes in the step S71), it is determined that starting of the data transfer is not possible. Then, the request for starting the data transfer is put into the wait queue (in a step S72). Then, the interrupt process, to be described later, is waited for.

When it is determined that DP>1−BP does not hold (No in the step S71), it is determined that starting of the data transfer is possible. Then, the rate BP of using the bus is updated as a result of the currently calculated rate DP of using the bus being added to the rate BP of using the bus (in a step S73). Then, in order to perform the periodic data transfer, starting of which is newly requested, a periodic program for performing the data transfer is started (in a step S74). The periodic program is a program which is periodically called for performing a process. In this case, the periodic program is used for performing a process in which data to be output to the synchronously outputting I/F 54 is written in the data outputting FIFO 53 of the synchronously outputting I/F module 52.

In the interrupt process performed when already-started DMA is finished or the interrupt process started by a timer device (see FIG. 10), the device control process is performed in the interrupt process routine of the device driver for the device which initiates the interrupt process (in a step S75). (The timer device is a device which always periodically initiates the interrupt process.) Then, it is determined whether the interrupt process has been initiated by the timer device (in a step S76). When it is determined that the interrupt process has been initiated by the timer device (Yes in the step S76), it is determined whether or not execution of a periodic program has already been finished (in a step S78). When it is determined that the interrupt process has not been initiated by the timer device (No in the step S76), it is determined that the interrupt process has been started as a result of already-started DMA being finished. Then, the rate BP of using the bus is updated as a result of the rate DP which was calculated and added to the rate BP of using the bus when the DMA was started being subtracted from the rate BP of using the bus (in a step S77). Then, it is determined whether or not execution of a periodic program has already been finished (in the step S78). When it is determined that execution of a periodic program has already been finished (Yes in the step S78), the rate BP of using the bus is updated as a result of the rate DP which was calculated and added to the rate BP of using the bus when execution of the periodic program was started being subtracted from the rate BP of using the bus (in a step S79). Then, it is determined whether or not a request for starting DMA or a request for starting periodic data transfer is present in the wait queue (in a step S80). When it is determined that a request for starting DMA or a request for starting periodic data transfer is present in the wait queue (Yes in the step S80), it is determined whether $$DP > 1 - BP$$

holds (in a step S81) where DP is the rate of using the bus calculated for the DMA or the periodic data transfer, the request for starting of which is present at the top of the wait queue, and BP is the rate of using the bus updated in the step S67 or S71, the step S77 and/or the step S79. Thus, it is determined whether or not enough capacity is free in the common bus 4 to be used by the DMA or the periodic data transfer, a request for starting of which is present at the top of the wait queue. When it is determined that DP>1−BP does not hold (No in the step S81), and, thus, it is determined that enough capacity is free in the common bus 4 to be used by the DMA or the periodic data transfer, a request for starting of which is present at the top of the wait queue, the request for starting DMA or the request for starting the periodic data transfer is deleted from the wait queue (in a step S82). Then the rate BP of using the bus is updated as a result of the rate DP of using the bus when the DMA or the periodic data transfer uses the bus being added to the rate BP of using the bus (in a step S83). Then, it is determined whether or not the request present at the top of the wait queue is the request for starting the periodic data transfer to be performed by the processors 2, 3 (in a step S84). When it is determined that the request which was present at the top of the wait queue and deleted therefrom as mentioned above is the request for starting the periodic data transfer (Yes in the step S84), execution of the periodic program for performing the periodic data transfer is started (in a step S85). When it is determined the request which was present at the top of the wait queue and deleted therefrom as mentioned above is the request for starting the DMA (No in the step S84), the DMA is started (in a step S86).

Thus, in the fourth embodiment, in a case where, for example, continuous data transfer such as that of a copying operation for copying a large amount of data, or data transfer performed as a result of a program being periodically executed, is requested, when enough capacity is not free in the common bus 4 to be used by the newly requested data transfer, starting of the data transfer is kept waiting. Thereby, it can be prevented that data transfer cannot be guaranteed due to starting of the newly requested DMA when the data transfer for an interface which needs data transfer of a fixed data transfer rate has been already started using the common bus 4.

Further, the present invention is not limited to the above-described embodiments, and variations and modifications may be made without departing from the scope of the present invention.

The contents of the basic Japanese Patent Application No.9-210233, filed on Aug. 5, 1997, are hereby incorporated by reference.

What is claimed is:

1. A data transfer control system, comprising:

a common bus;

at least one processor connected to said common bus;

at least one direct memory access controller connected to said common bus; and a memory connected to said common bus, wherein said processor determines whether or not a newly requested direct memory access can be performed, using:

(i) a present data transfer rate on said bus between all direct memory access controllers, which have already started direct memory access and all processors, (ii) a data transfer rate required by the newly requested direct memory access, (iii) a size of data, which is transferred in one direct memory access operation or a size of data, which said memory can accept, (iv) a latency for accessing said memory, and (v) a latency for bus-right arbitration;

said processor starts said newly requested direct memory access when it is determined that said newly requested direct memory access can be performed; and said processor waits to start said newly requested direct memory access when it is determined that said newly requested direct memory access cannot be performed and starts said newly requested direct memory access, which has been kept waiting to start, when any direct memory access, which has already been carried out is completed and enough capacity is free in said common bus for carrying out said newly requested direct memory access.

2. A data transfer control method for use in a system including a common bus, at least one processor connected to said common bus, at least one direct memory access controller connected to said common bus and a memory connected to said common bus, said method comprising:

determining whether or not a newly requested direct memory access can be performed, using:

(i) a present data transfer rate on said bus between all direct memory access controllers, which have already started direct memory access and all processors, (ii) a data transfer rate required by the newly requested direct memory access, (iii) a size of data, which is transferred in one direct memory access operation or a size of data, which said memory can accept, (iv) a latency for accessing said memory, and (v) a latency for bus-right arbitration;

starting said newly requested direct memory access when it is determined that said newly requested direct memory access can be performed; and waiting to start said newly requested direct memory access when it is determined that said newly requested direct memory access cannot be performed and starting said newly requested direct memory access, which has been kept waiting to start, when any direct memory access, which has already been carried out is completed and enough capacity is free in said common bus for carrying out said newly requested direct memory access.

3. A computer program product comprising a computer storage medium having a computer program code mechanism embedded in said computer storage medium for causing a computer to perform data transfer control in a system including a common bus, at least one processor connected to said common bus, at least one direct memory access controller connected to said common bus and a memory connected to said common bus, said computer program code mechanism comprising:

a first computer code device configured to determine whether or not a newly requested direct memory access can be performed, using:

(i) a present data transfer rate on said bus between all direct memory access controllers, which have already started direct memory access and all processors, (ii) a data transfer rate required by the newly requested direct memory access, (iii) a size of data, which is transferred in one direct memory access operation or a size of data, which said memory can accept, (iv) a latency for accessing said memory, and (v) a latency for bus-right arbitration;

a second computer code device configured to start said newly requested direct memory access when it is determined that said newly requested direct memory access can be performed; and a third computer code device configured to wait to start said newly requested direct memory access when it is determined that said newly requested direct memory access cannot be performed and configured to start said newly requested direct memory access, which has been kept waiting to start, when any direct memory access, which has already been carried out is completed and enough capacity is free in said common bus for carrying out said newly requested direct memory access.

* * * * *